United States Patent [19]

Berfield

[11] Patent Number: 4,705,282
[45] Date of Patent: Nov. 10, 1987

[54] VEHICLE WITH READILY MOUNTABLE STEERING HANDLE

[75] Inventor: Robert C. Berfield, Jersey Shore, Pa.

[73] Assignee: Shop-Vac Corporation, Williamsport, Pa.

[21] Appl. No.: 919,836

[22] Filed: Oct. 16, 1986

[51] Int. Cl.$^4$ .............................................. B62B 3/02
[52] U.S. Cl. ............................ 280/47.37 R; 15/79 R; 16/111 R
[58] Field of Search ............... 15/49 C, 79 R, 79 A, 15/143 A; 16/111 R, 111 A, 114 R, DIG. 24, DIG. 38, DIG. 40; 280/47.36, 47.37 R

[56] References Cited

U.S. PATENT DOCUMENTS

| | | | |
|---|---|---|---|
| 2,350,062 | 5/1944 | Mosier | 280/47.37 R |
| 2,530,592 | 11/1950 | Aries | 280/47.36 |
| 2,724,598 | 11/1955 | Kharzen | 280/47.37 R |
| 3,037,308 | 6/1962 | Miller | 280/47.37 R X |
| 3,243,196 | 3/1966 | Amis | 280/47.37 R |
| 4,110,869 | 9/1978 | Hastings | 280/47.37 R |
| 4,115,890 | 9/1978 | Burgoon | 280/47.37 R X |
| 4,169,607 | 10/1979 | Reese | 280/47.37 R X |

FOREIGN PATENT DOCUMENTS 178718 10/1935 Switzerland .................... 280/47.36

Primary Examiner—John J. Love
Assistant Examiner—Michael Mar
Attorney, Agent, or Firm—Ostrolenk, Faber, Gerb & Soffen

[57] ABSTRACT

A handle used for steering purposes is easily mounted to a vehicle body used for sweeping or other purposes. The vehicle body includes a transverse axle on which right and left wheels are provided. A pair of elongated mounting brackets are provided each having a respective aperture for receiving the axle therethrough. Preassembly of the vehicle preferably includes positioning of the mounting brackets on the axle. The handle includes a pair of free ends each provided with a respective mounting section having a notched portion at a free end. The notched portions in the handle are for receiving the axle or similar support member therein. The handle is mounted to the vehicle body by positioning the handle such that the notched portions at the free ends of the handle receive respective portions of the axle. Each mounting section is positioned adjacent a respective mounting bracket, and is thereafter secured to the mounting bracket with screws or other fastening devices. Front and rear stop arrangements are provided for limiting forward and rearward rotation of the handle relative to the vehicle body.

11 Claims, 3 Drawing Figures

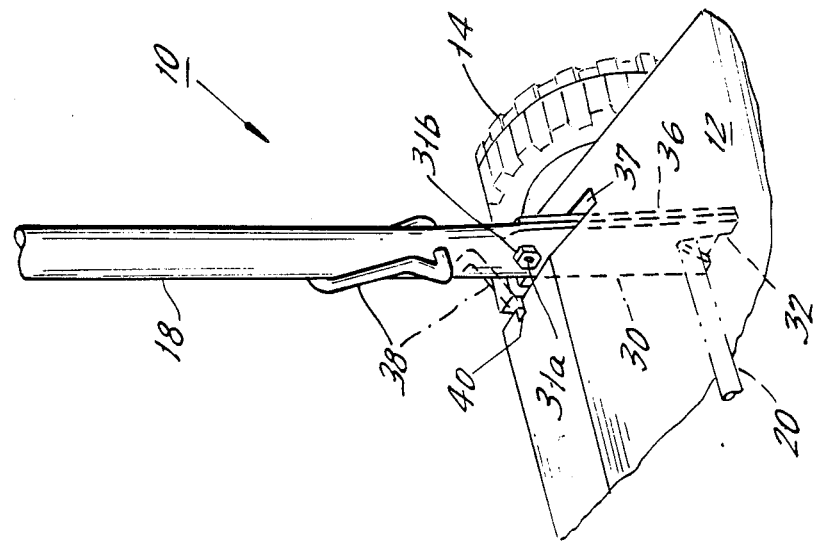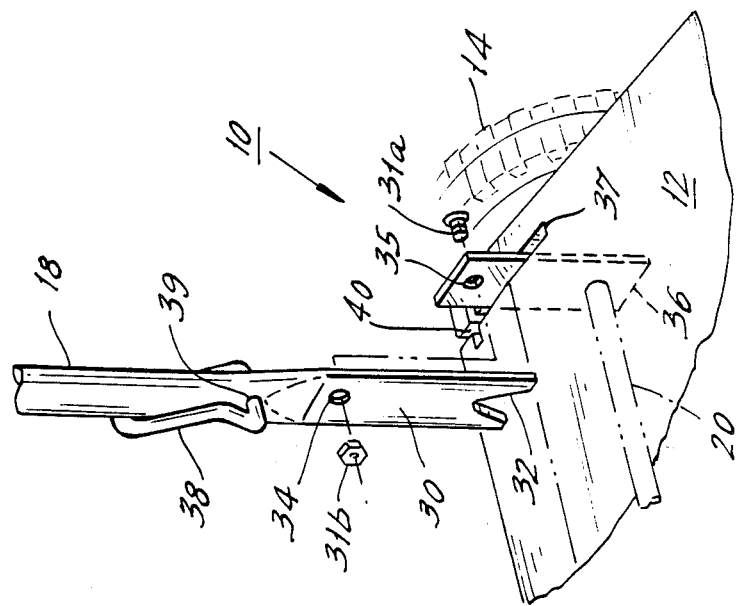

ized. Accordingly, mounting
VEHICLE WITH READILY MOUNTABLE STEERING HANDLE

BACKGROUND OF THE INVENTION

The present invention relates to a vehicle for sweeping or other purposes, including a handle for steering that is readily mountable onto a body of the vehicle, and further relates to a method of mounting a handle onto the body of a vehicle used for sweeping or other purposes.

When packaging vehicles, such as sweepers, into boxes for shipment from a manufacturing facility to points of sale, it would be desirable to use the smallest boxes possible. To achieve a high degree of compactness, the handle for a vehicle should be separated from the body of the vehicle. When the vehicle is unpacked by a consumer, it would be desirable for the consumer to be able to easily mount the handle to the vehicle body.

SUMMARY AND OBJECTS OF THE INVENTION

It, accordingly, is an object of the present invention to provide a vehicle with a handle for steering that is readily mountable onto a body of the vehicle.

It is another object of the invention to provide a method for mounting a handle onto a vehicle body in a simple manner.

A further object of the invention is to provide a vehicle with a handle for steering that is provided with easily formed forward and rearward stops to limit forward and rearward rotation of the handle.

The invention relates to a vehicle having a vehicle body with first and second transverse support members, which may comprise an axle on which left and right wheels are mounted. A handle is provided having first and second mounting sections situated at respective left and right lower ends of the handle. First and second elongated mounting brackets are provided for engaging the first and second mounting sections, respectively. In a preferred mounting procedure, the first and second mounting brackets each have an aperture at a respective lower end for receiving therethrough a respective portion of the axle or other support member. The mounting sections of the handle are each provided with a respective notched portion at a lower end for receiving a respective portion of the axle or other supporting member. Upper portions of the mounting sections and the mounting brackets are provided with respective transverse apertures or other configurations, to facilitate fastening of each mounting section to a respective mounting bracket. Bolts may be passed through the apertures, for example, to secure together each mounting section and adjacent mounting bracket.

In a preferred method of mounting a handle to a vehicle body, a pair of mounting brackets are provided. The mounting brackets each have a transverse aperture at a lower end for receiving therethrough the respective portion of an axle or other support member of the vehicle body. A handle is provided having free ends, and respective notched portions open downwardly at the free ends. The notched portions receive the axle or other support member of the vehicle body. The handle is conveniently mounted onto the vehicle body with the notched portions thereof receiving the axle, and with each of the free ends respectively positioned adjacent a respective one of the mounting brackets. Each free end of the handle is then affixed to the adjacent mounting bracket. This may be accomplished by use of bolts and nuts, for example.

BRIEF DESCRIPTION OF THE DRAWINGS

These objects as well as other objects of this invention shall become readily apparent after reading the following description of the accompanying drawing in which:

FIG. 2 is a detail view of an arrangement for mounting an end of a handle onto a vehicle body, and wherein the handle is shown prior to its final placement on the vehicle body; and FIG. 3 is a view similar to FIG. 2 showing a handle mounted in its final position on a vehicle body, and further illustrating front and rear stop means which limit forward and rearward travel of the handle relative to the vehicle body.

DESCRIPTION OF THE PREFERRED EMBODIMENTS

Figure 1:
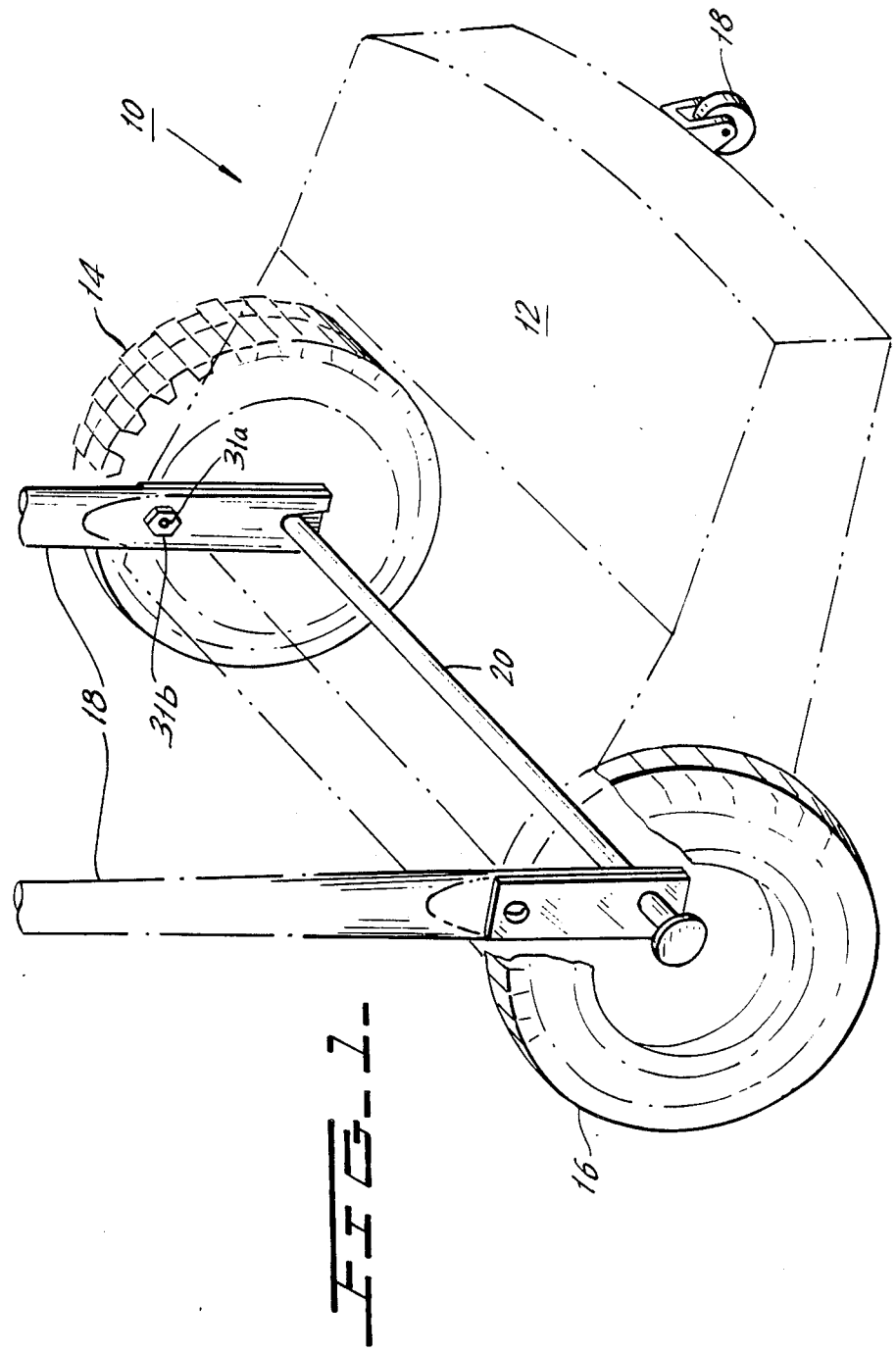
FIG. 1 is a simplified view in perspective of a vehicle, such as a sweeper, on which a handle is mounted in accordance with the present invention.

FIG. 1 illustrates in simplified form a vehicle 10, which may constitute a floor sweeper, by way of example. Vehicle 10 includes a vehicle body 12 on which there are mounted right and left rear wheels 14 and 16, respectively, and front wheel 18, which may be a caster.

Vehicle 10 includes a handle 18 that has a manually graspable yoke portion (not shown) for steering purposes and for propulsion of the vehicle if self-propulsion means are not included.

Vehicle 10 advantageously includes a transverse axle 20 on which wheels 14 and 16 are mounted. Axle 20 may support handle 18, or left and right transverse support members may be provided from which the left and right sides of handle 18, respectively, may be supported.

Further details of the present arrangement for mounting handle 18 onto vehicle 10 are shown in FIGS. 2 and 3. FIG. 2 is an exploded view of the handle mounting arrangement of the invention. With reference to FIG. 2, handle 18 includes a mounting section 30 at a lower or free end of the handle. Mounting section 30 includes a downwardly opening notch 32 at a lower or free end of the mounting section. By "lower end" is meant the lower portion of handle 18 as illustrated; that is, that portion of the handle remote from the manually-graspable yoke portion (not shown). Mounting section 30 is configured with an aperture 34 at its upper end to facilitate fastening to a mounting bracket 36, which has a cooperating aperture 35. Bolt 31a and not 31b can be used for this purpose. Mounting bracket 36 protrudes above housing body 12 through an aperture 37. Handle 18 further includes a handle stop member 38, which cooperates with a stop groove 40 in housing 12 for purposes described below.

Mounting section 30 is preferably flat with its left and right sides being symmetrical. Accordingly, mounting section 30 can be fastened to either the left or right side of bracket 36. This arrangement facilitates the installation of handle 18 onto housing 12, especially when done by an ordinary consumer.

Stop member 38 preferably comprises a partial wire loop with two free ends protruding into the opposng lateral sides of handle 18 at 39, for example.

FIG. 3 shows handle 18 assembled to housing 12 of sweeper 10. Mounting section 30 of handle 18 is shown to the left of mounting bracket 36, with bolt 31a and nut 31b fastening together the upper portions of mounting section 30 and bracket 36. The downwardly-opening notch 32 of mounting section 30 is positioned to receive therein axle 20, or another lateral support member.

The attachment of handle 18 to housing 12 of the sweeper may be accomplished in an extremely easy fashion when mounting bracket 36 has been mounted on axle 20 in a preassembly procedure. The illustrated portion of handle 18, comprising support section 30, is then placed through aperture 37 in housing 12, with slot 32 at the lower end of the handle positioned to receive axle 20 therein. With the left and right sides of mounting section 30 being symmetrical to each other, respectively, mounting section 30 can be inserted into aperture 37 on either the left or the right side of mounting bracket 36. Thereafter, bolt 31a can be inserted through apertures 34 and 35 in support section 30 and mounting bracket 36 to complete the affixation of section 30 to bracket 36. The left portion of handle 18 (FIG. 1) preferably is attached to housing 12 in the same manner as the right portion of handle 12 as illustrated in FIGS. 2 and 3.

Forward and rearward movement of handle 18 relative to housing 12 of the sweeper is limited in the following manner. Rearward movement of handle 18 is limited when stop member 38 is swung downwardly, as shown in phantom in FIG. 3 to an extent whereby a rear portion of stop member 38 projects downwardly into groove 40 in housing 12. With stop member 38 engaged in stop groove 40, a user of vehicle 10 may lift the front of the vehicle by pressing downwardly on the yoke portion (not shown) of handle 18. Sweeper 10 can also be lifted from the ground merely by lifting handle 18 so long as stop member 38 is engaged in stop groove 40.

To raise the rear of vehicle 10, a user pushes forwardly on handle 18. The respective front surfaces of mounting section 30 and mounting bracket 36 become impinged against the front of aperture 37, and continued movement of handle 18 forwardly relative to vehicle body 12 causes the rear of vehicle 10 to be lifted in the air.

The present invention describes a vehicle, such a sweeper, having a handle that may be easily attached thereto, without complicated instructions, and without the need for skilled labor.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A vehicle with a handle for steering purposes that is mountable to a body of the vehicle, comprising:
   a handle having first and second mounting sections situated at respective lower ends of the handle; each mounting section having a pair of opposing transverse surfaces;
   a vehicle body including a housing and transverse axle means for supporting the first and second mounting sections, respectively;
   first and second elongated mounting brackets for engaging the first and second mounting sections, respectively; each bracket having a pair of generally flat opposing transverse surfaces, having at its lower end a respective aperture for receiving therethrough the axle means and thereby being rotatable about the axle means and movable relative to the housing, and having at position above the aperture a configuration for fastening onto an upper end of a respective one of the first and second handle mounting sections; and
   the first and second mounting sections each having a transverse lower edge with a notched portion therein for receiving the transverse axle means and being configured at a position above the notched portion for fastening onto a respective one of the mounting brackets.

2. The vehicle of claim 1, further comprising right supported by the axle means. support members comprise respective portions of the axle.

3. The vehicle of claim 1, wherein the front and rear portions of each mounting bracket are symmetrical with each other, whereby the front-to-rear orientations of the mounting brackets are interchangeable.

4. The vehicle of claim 1, wherein the transverse surfaces of the mounting sections are symmetrical with each other and the tranverse surfaces of the mounting brackets are symmetrical with each other, whereby each mounting section may be attached to a respective mounting bracket at either transverse side of the mounting bracket.

5. The vehicle of claim 4, wherein the mounting sections and the mounting brackets are each configured as elongated, flat members.

6. The vehicle of claim 1, wherein upper portions of each mounting section and associated mounting bracket are provided with respective apertures aligned with each other for receiving a fastening device therethrough.

7. The vehicle of claim 6, wherein the fastening device comprises a bolt.

8. The vehicle of claim 1, further comprising:
   a stop member mounted on the handle and protruding rearwardly of the handle; and
   a cooperating recess in the housing situated rearwardly of the handle for receiving a portion of the mounting stop therein.

9. The vehicle of claim 8, wherein the stop member comprises a partial loop of material having a pair of free ends protruding through respective apertures in the handle, whereby the stop member is readily affixed to the handle.

10. A method of mounting a steering handle to a vehicle body, comprising:
    providing a vehicle body including a housing transverse axle means, and first and second brackets with apertures at one end for receiving the axle means and thereby being rotatable about the axle means and movable relative to the housing, each bracket having a pair of generally flat, opposing transverse surfaces;
    providing a handle with a pair of free ends, each of the free ends having a notched portion for receiving the axle means;
    inserting the handle onto the vehicle body in such a manner that the notched portions on the handle respectively receive the axle members;
    positioning each free end of the handle adjacent a respective one of the mounting brackets; and
    securing each free end of the handle to a respective mounting bracket.

11. The method of mounting a handle onto a vehicle body as set forth in claim 10, wherein the step of securing the free ends of the handle to the mounting brackets comprises securing these parts with bolts.

* * * * *